United States Patent
Berzelak et al.

(10) Patent No.: US 9,226,618 B2
(45) Date of Patent: Jan. 5, 2016

(54) DEVICE FOR CUTTING UP FOODSTUFFS

(75) Inventors: Matej Berzelak, Mozirje (SI); Andrej Blagotinsek, Slovenj Gradec (SI); Uros Jegrisnik, Polzela (SI); Stanislav Mazej, Gomilsko (SI)

(73) Assignee: BSH HAUSGERAETE GMBH, Munich (DE)

( * ) Notice: Subject to any disclaimer, the term of this patent is extended or adjusted under 35 U.S.C. 154(b) by 306 days.

(21) Appl. No.: 13/814,245

(22) PCT Filed: Aug. 9, 2011

(86) PCT No.: PCT/EP2011/063671
§ 371 (c)(1),
(2), (4) Date: Feb. 5, 2013

(87) PCT Pub. No.: WO2012/025368
PCT Pub. Date: Mar. 1, 2012

(65) Prior Publication Data
US 2013/0134247 A1    May 30, 2013

(30) Foreign Application Priority Data
Aug. 24, 2010  (DE) .......................... 10 2010 039 720

(51) Int. Cl.
| | |
|---|---|
| B26D 1/00 | (2006.01) |
| B26D 3/11 | (2006.01) |
| A47J 43/07 | (2006.01) |
| B26D 7/26 | (2006.01) |
| B26D 3/18 | (2006.01) |

(Continued)

(52) U.S. Cl.
CPC ................. *A47J 43/07* (2013.01); *B26D 3/185* (2013.01); *B26D 7/2614* (2013.01); *B26D 3/22* (2013.01); *B26D 7/00* (2013.01); *B26D 7/065* (2013.01)

(58) Field of Classification Search
CPC ......... A25D 3/22; A25D 3/18; A25D 7/2614; B26D 3/22; B26D 3/18; B26D 7/2614
USPC .............. 99/509, 510, 537; 83/857, 858, 932, 83/663, 865; 30/114, 279.2, 287, 299, 30/304, 303, 302; 241/92, 101.01, 282.1
See application file for complete search history.

(56) References Cited

U.S. PATENT DOCUMENTS

| | | | |
|---|---|---|---|
| 4,369,680 A * | 1/1983 | Williams | 83/13 |
| 6,604,455 B2 * | 8/2003 | Areh et al. | 99/510 |

(Continued)

FOREIGN PATENT DOCUMENTS

| | | |
|---|---|---|
| DE | 1156267 B | 10/1963 |
| DE | 20314246 U1 | 12/2003 |

(Continued)

OTHER PUBLICATIONS

International Search Report PCT/EP2011/063671 dated Oct. 7, 2011.

(Continued)

*Primary Examiner* — Reginald L Alexander
(74) *Attorney, Agent, or Firm* — Laurence Greenberg; Werner Stemer; Ralph Locher

(57) ABSTRACT

An apparatus for a kitchen appliance for handling items to be processed includes a static housing part having an upper axial face, and a rotating ring element having a lower axial face which rests on the upper axial face of a static housing part in the presence of an annular gap there between. The upper axial face and/or the lower axial face and/or the rotating ring element is hereby constructed such as to effect a radial conveying of items being processed in the annular gap.

34 Claims, 2 Drawing Sheets

(51) Int. Cl.
*B26D 3/22* (2006.01)
*B26D 7/00* (2006.01)
*B26D 7/06* (2006.01)

(56) References Cited

U.S. PATENT DOCUMENTS

| 8,122,820 B2 * | 2/2012 | Conti et al. ............ 99/509 |
| 2004/0060414 A1 * | 4/2004 | Sundqvist .............. 83/663 |
| 2010/0154659 A1 | 6/2010 | Conti et al. |

FOREIGN PATENT DOCUMENTS

| DE | 20314247 U1 | 12/2003 |
| EP | 2323820 B1 | 12/2011 |
| FR | 2548573 A1 | 1/1985 |

OTHER PUBLICATIONS

Report of Examination DE 10 2010 039 720.2 dated Feb. 16, 2011.

* cited by examiner

DEVICE FOR CUTTING UP FOODSTUFFS

FIELD OF THE INVENTION

The invention relates to an apparatus for a kitchen appliance for handling items to be processed, for example for dicing foodstuffs, having a rotating ring element, the lower axial face of which rests on an upper axial face of a static housing part. The invention also relates to a food processor equipped with such an apparatus.

BACKGROUND TO THE INVENTION

An apparatus and facility of the type mentioned in the introduction are known from the publication DE 10 2008 040 937 A1. The apparatus for dicing foodstuffs described there comprises a cylindrical bowl, which is provided to be positioned on a food processor. The food processor has an upward projecting drive shaft, which during operation penetrates the bowl in the region of a central, sleeve-type cutout. Positioned on the upper edge of the bowl is a housing part, which accommodates both the rotating cutting tool and the static cutting grid. The housing part can be closed off with a cover, which has an upward projecting feed shaft for feeding in items to be processed in the region of the cutting grid. The drive shaft of the food processor is let into a coupling facility of the cutting tool with a form fit in the upper region of the cutout to transfer the torque.

The housing part is configured in the manner of a circular disk and provided with an eccentrically disposed, approximately rectangular opening for the passage of the items to be processed, which tapers conically in the lower region. The similarly rectangular cutting grid can be positioned flush with the upper face of the housing part on supporting ribs provided in the tapering part of the opening. Also present in the center of the housing part is an essentially cylindrical hole, which is vertical in the operating position, parts of its lateral surface transitioning into the opening. For this reason the cutting grid has a notch, which follows the lateral surface. The hole is provided to accommodate the sleeve-type coupling facility of the cutting tool, which is configured as open at the bottom for positioning on the drive shaft of the food processor. At the top the cutting tool is provided in the region of the coupling facility with a peripheral collar and a pin, which are disposed coaxially to one another and to the rotation axis of the drive shaft. The cutting tool is supported in a radially rotatable manner on a downward projecting annular projection of the cover both by way of the lateral surface of the coupling facility in the hole and by means of collar or pin.

The cutting tool is also equipped with a ring element, which is aligned coaxially to the rotation axis, running round the entire periphery in the region of its outer periphery, and is connected to the upper part of the coupling facility by way of two cutting blades that extend horizontally and are located opposite one another. Ring element and coupling facility together therefore form a blade support for the cutting tool. The cutting blades are usually angled so that the items being processed, which are cut transversely into slices by the cutting tool, are driven during its rotation through the cutting grid due to the wedge effect and cut longitudinally there. Support facilities in the form of hook-type locking elements are distributed in a regular manner on the housing part along the outer periphery and can each be pivoted at their lower end about a vertical rotation axis aligned tangentially to the outer periphery of the housing part.

When the apparatus is brought into operation, the coupling facility is pushed into the hole, until the lower axial face of the ring element rests on the upper face of the housing part. The opened ring elements are then pushed by a pivoting movement directed toward the center of the housing part with their upper horizontal arms over the upper axial face of the ring element, until they rest against one another. Such apparatuses for chopping items to be processed and food processors equipped therewith have proven effective in practice. However it is possible, when processing items that have a particular tendency to catch, for the items being processed to collect in the annular gap between the static housing part and the rotating ring element of the tool and produce unwanted friction, which can result in a power loss for the food processor and a thermal stress on the axial faces of housing part and tool as they move relative to one another.

A further apparatus for handling items to be processed, in particular for dicing fruit and vegetables, is known from the German utility model document DE 203 14 247 U1. It consists of a dicing grid disposed in a fixed position in the processor body and a blade rotating parallel thereto. The blade is configured in the manner of a bar and has two blade bodies, which are disposed with mirror symmetry to one another and are connected to the drive shaft of the apparatus. Together with the dicing grid the blade bodies form a wedge-type gap that narrows as the blade rotates and generates the axial force required to cut the items to be processed in the dicing grid. The corresponding counterforce is absorbed by a support facility in the form of two support rollers tapering conically toward the dicing grid, which are disposed in the region of the dicing grid over which the blade bars first pass at the level of the outer periphery of the blade. The outer periphery of each blade body, which is shaped to complement the conical support rollers, runs into the roller once per rotation during operation of the apparatus, said roller absorbing the axial reaction forces directed away from the dicing grid and acting on the blade and diverting them to the processor body. This prevents a non-permissible bending of the blade, which may result in an uneven processing result and contact between the blade and the feed shaft. The conical rollers can be set in their axial position relative to the machine body by way of a clamping facility.

This apparatus has no outer annular blade support, so caught items being processed cannot produce friction in an annular gap. However it has the disadvantage that the blade bodies run against the conical lateral surface of the support rollers during each rotation, which can increase the noise emission of the apparatus. There is also a risk that when the blade bodies run into the support rollers, elements of the items being processed can get between these and the outer periphery of the blade. If the support rollers are set incorrectly, the blades or support facility may be subject to greater wear or even damage.

BRIEF SUMMARY OF THE INVENTION

The object underlying the invention is to provide an improved apparatus for a kitchen appliance for handling items to be processed, having a rotating ring element, the lower axial face of which rests on an upper axial face of a static housing part (2). The invention is intended to overcome the disadvantages known from the prior art. In particular the apparatus is to be further developed so that the catching of critical items being processed during operation of the food processor is largely prevented or eliminated, in order to prevent resulting wear or damage.

Inventive Solution

The object underlying the invention is achieved by an apparatus for the kitchen appliance for handling items to be processed, in particular for dicing foodstuffs, having a rotating ring element, the lower axial face of which rests on an upper axial face of a static housing part, with means for the radial conveying of the items being processed in the annular gap being provided on the upper and/or lower axial face of housing part and/or rotating ring element. The object is further achieved by a food processor, which is provided with such an apparatus.

It is an achievable advantage of the invention that items being processed that are caught in the annular gap and produce unwanted friction losses are subjected to a force acting radially from the annular gap, said force removing the items being processed at least partially from the annular gap and preventing extensive catching. This means that the power output of a processor, for example a food processor, causing the apparatus to rotate is essentially available for the processing work. The components of the processor, which move relative to one another, are also subject to less thermal stress in the region of their faces that rest axially on one another. In the case of thermally unstable items to be processed, the probability of thermal decomposition or oxidation is also reduced, thereby improving the quality of the items being processed.

Preferred Embodiments of the Invention

Advantageous configurations or developments, which can be utilized individually or in combination with one another, are the subject matter of the dependent claims.

The apparatus is preferably provided to chop items to be processed, in particular to dice foodstuffs, the rotating ring element being configured as a blade support for cutting blades rotating about a rotation axis along a cutting grid and the housing part accommodating a cutting grid and having an axial opening in the region of the cutting grid. When chopping sticky foodstuffs, e.g. foodstuffs with a high sugar and/or water content, such apparatuses tend to catch items in a particular manner, so that the inventive advantages have a greater effect. Taste impairment due to thermal decomposition or oxidation can also be reduced.

The means for the radial conveying of the items being processed are advantageously provided in the direction of the rotation axis of the rotating ring element, where they can be guided to the items being processed as they are being processed, again in a particularly simple manner. It is therefore possible in particular to avoid the conveyed items being processed having to be picked up in some other manner.

In one preferred embodiment of the invention the means for radial conveying comprise at least one feed channel let into the upper and/or lower axial face and disposed obliquely in the radial direction, the radially outer region of the feed channel being provided ahead of the radially inner region of the feed channel in the rotating lower axial face of the ring element and/or behind in the static upper axial face of the housing part. This configuration can be particularly effective in respect of conveying and is structurally particularly simple to implement, for example by slight modification of the injection molding tool for tool or housing part injection molded from plastic.

In order for the removal of caught items being processed from the annular gap to be particularly effective, provision can advantageously be made for a plurality of feed channels to be distributed in an equidistant manner over the upper and/or lower axial face. The number of feed channels in a normal food processor can be between 6 and 10, in particular 8. This significantly reduces the time remaining for the items being processed to become caught during operation of the processor.

According to one preferred configuration the at least one feed channel runs in a straight line and is disposed obliquely at an angle of 30° to 60°, in particular around 45°, to the radial direction. This embodiment can be particularly effective in respect of conveying without excessively complicating cleaning of the machine. The at least one feed channel can however also be embodied differently, for example having the shape of a circular or spiral segment.

It is also preferable for the depth of the at least one feed channel to correspond to 0.1 to 0.5 times, in particular 0.2 times, the length of the feed channel. This depth allows particularly good conveying results to be achieved for the usual items to be processed in the kitchen, without having too great an adverse effect on the stability of the ring element and/or the housing part, so that it should also generally be possible to incorporate the feed channel in an existing structure at a later stage.

To reduce wear in the region of the feed channel, provision can also advantageously be made for the edges between feed channel and axial face to be equipped with a chamfer, in particular of 45°.

In one preferred configuration of the invention the at least one feed channel is disposed on the lower, annular axial face of the ring element. With a change of tool it is therefore possible to adjust not only the cutting blades but also the means for radial conveying to the respective processing instance. It is also preferable for the at least one feed channel to open out at the radial inner periphery of the ring element and preferably to extend from the outer periphery to the inner periphery of the ring element. This improves the feed action and further facilitates tool cleaning.

It can be particularly advantageous in this instance if a depression for collecting the conveyed items being processed is let into the upper axial face of the housing part this side of the ring element. The items being processed, which are conveyed radially inward from the annular gap, can be picked up from this depression and then be gripped by the passing blades and fed into the processing process.

The return of the items being processed, which have collected in the depression, can be particularly favorably influenced in that the depression is disposed behind the cutting grid relative to the rotation direction of the ring element. Also the depth of the depression preferably decreases in the rotation direction of the ring element. It particularly preferably transitions on its face facing away from the cutting grid into the surface of the housing surrounding the depression in an essentially continuous manner. This allows the items being processed to be conducted particularly favorably into the feed channel(s) of the ring element.

In one preferred embodiment of the invention the depression tapers in the radial direction in the rotation direction of the ring element. It is also preferable, to simplify cleaning of the housing part, for the depression to open into the holder for the cutting grid.

BRIEF DESCRIPTION OF THE DRAWINGS

The invention is explained further in more detail below based on an exemplary embodiment with reference to schematic drawings, in which.

DETAILED DESCRIPTION OF EXEMPLARY EMBODIMENTS OF THE PRESENT INVENTION

Direction and position data in the description which follows relates to the normal integration and operating position of the apparatus, in which the rotation axis of the tool runs vertically and the rotating ring element rests on the housing part.

Figure 1:
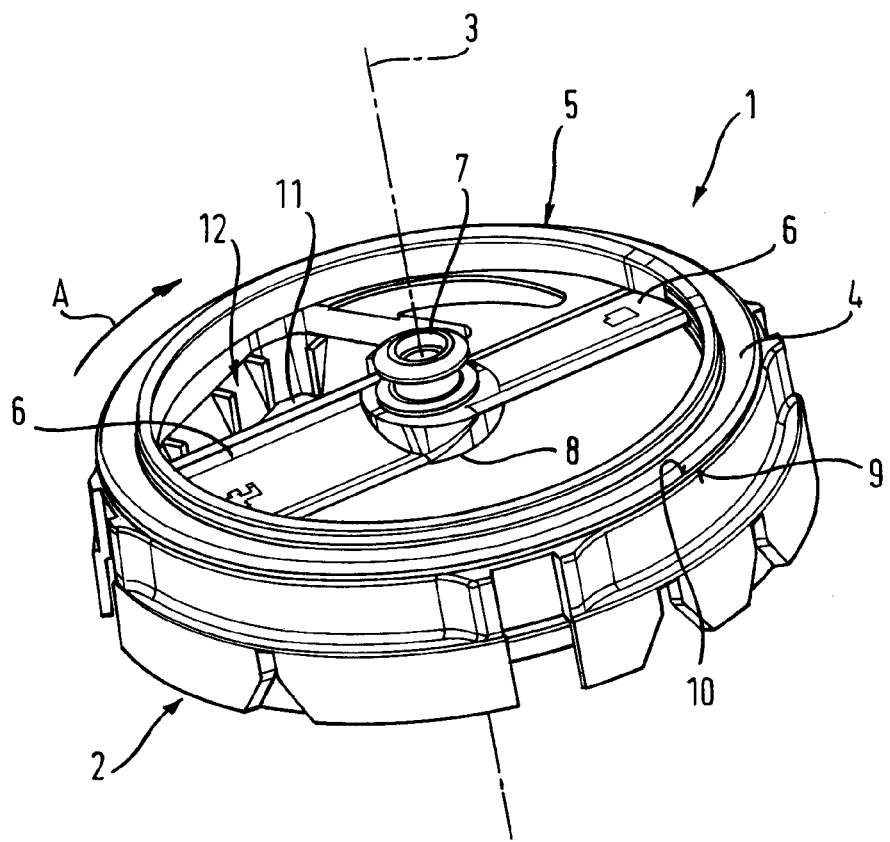
FIG. 1 shows a perspective view of an inventive apparatus for use in a food processor.
Figure 1:

The apparatus shown in FIG. 1 comprises a tool 1, which can be made to rotate (rotation direction A) about a rotation axis 3 in relation to a static housing part 2 to handle items to be processed. The tool 1 has a peripheral ring element 4 on the outside, serving as a blade support 5 for two diametrically opposed cutting blades 6. In its center the tool 1 has a coupling 7 for torsionally resistant connection to the drive shaft (not shown) of the food processor 100. The housing part 2 is configured as cylindrical coaxial to the rotation axis 3 and has a central hole 8, into which the coupling 7 of the tool 1 can be inserted. In the mounted state the lower axial face 9 of the ring element 4 rests on the upper axial face 10 of the housing part 2. Tool 1 and housing part 2 are generally made at least substantially of thermoplastic plastic material by means of injection molding.

The housing part 2 also has an axial opening 11 off center, with a holder 12 to hold a static cutting grid (not shown), which lies flush with the upper axial face 10 of the housing part during operation of the apparatus. To dice foodstuffs, said foodstuffs are guided down by way of a shaft (not shown) to the cutting grid, cut into slices by the oblique cutting blades 6 and pressed through the cutting grid, with the result that the slices are cut into dice.

During this process items being processed or juice therefrom can accumulate in the very narrow annular gap between the upper axial face 9 of the ring element 4 and the lower axial face 10 of the housing part 2 and significantly increase the friction occurring during rotation of the tool 1. This results in power losses and thermal stress on the apparatus and the items being processed.

Figure 2:
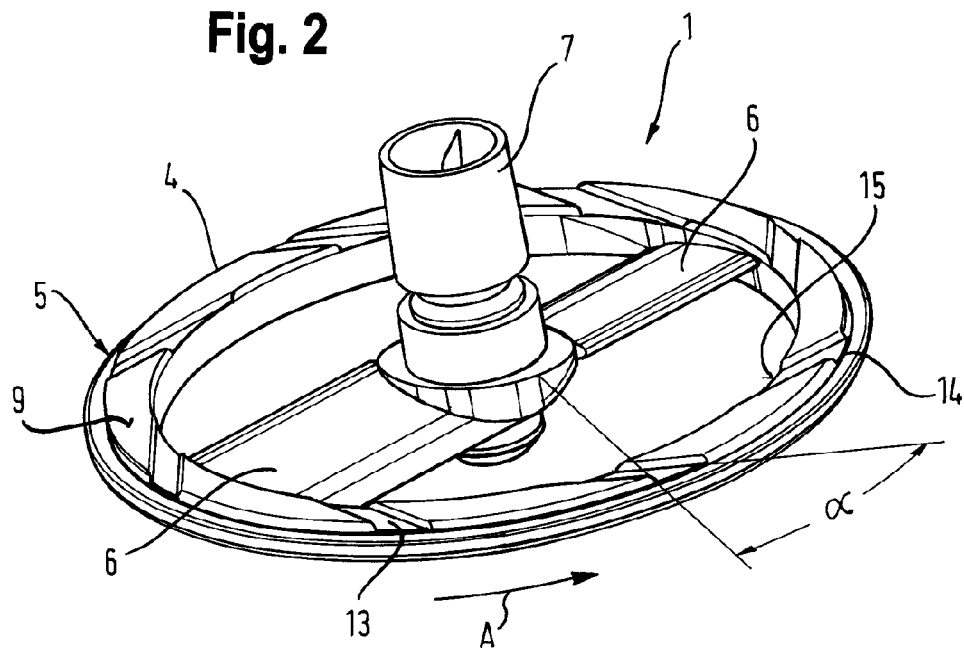
FIG. 2 shows a perspective view, overhead in respect of the operating position, of the rotatably drivable tool of the apparatus shown in FIG. 1.

As shown in FIG. 2, a plurality of feed channels 13 at equal distances from one another are let into the lower axial face 9 of the ring element 4, each being oriented obliquely at an angle $\alpha$ in relation to the radial direction. The feed channels 13 have a constant width and depth over the entire extension of the ring element 4 and are angled so that the radially outer region 14 of each feed channel 13 is provided ahead of the radially inner region 15 of the relevant feed channel 13. During rotation of the tool 1 items being processed which are present in the annular gap are picked up first by the feed channels 13. Friction at the housing part 2 causes a force counter to the rotation direction (arrow A) to be exerted on the items being processed that are present in the feed channels 13, said force having a radial inward force component and thus bringing about radial conveying in the direction of the rotation axis 3. The emptying feed channels 13 are continuously filled with further items to be processed, the edges scraping items being processed that are caught between axial face 9 and feed channel 13 from the axial face 10.

Figure 3:
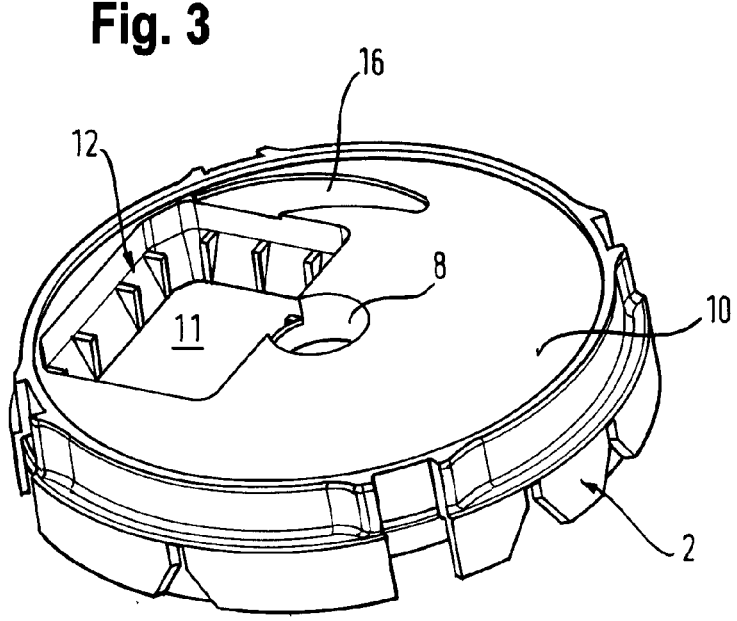
FIG. 3 shows a perspective view of the housing part of the apparatus shown in FIG. 1.

A depression 16 is let into the upper axial face 10 of the housing part 2, as shown in FIGS. 1 and 3, this side of the ring element 4 and behind the opening 11. The depression 16 picks up the radially conveyed items being processed from the feed channels 13 speeding by as the ring element 4 rotates and feeds them back to the processing process. The depression 16 opens into the holder 12 counter to the rotation direction of the tool 1 and tapers in the radial and axial direction in the rotation direction of the tool 1, so that the occurrence of accumulations in the depression 16 is prevented.

The invention allows items being processed which become caught in the annular gap and cause unwanted friction losses to be removed at least partially from the annular gap, thereby avoiding any resulting friction. The power output of the food processor is thus essentially available for processing work. The components of the processor that move relative to one another in the region of their faces resting axially on one another are also subject to less thermal stress. In the case of thermally unstable items to be processed, the probability of thermal decomposition or oxidation is also reduced, thereby improving the quality of the items being processed.

The features disclosed in the above description, the claims and the drawings can be of significance in their various embodiments both individually and in any combination for the implementation of the invention. None of the reference characters in any of the claims have a restrictive effect but are merely intended to improve ease of reading.

The invention claimed is:

1. Apparatus for a kitchen appliance for handling items to be processed, said apparatus comprising:
   a static housing part having an upper axial face; and
   a rotating ring element having a radially inwardly directed cutting blade and a lower axial face which rests on the upper axial face of the static housing part,
   at least one member selected from the group consisting of the upper axial face, the lower axial face and the rotating ring element being configured for conveying items being processed in the kitchen appliance out of an annular gap between the upper axial face and the lower axial face,
   the member including at least one recessed feed channel extending obliquely in a radial direction, said feed channel having a radially outer region and a radially inner region, with the radially outer region of the feed channel provided in relation to the radially inner region of the feed channel in at least one of two ways, a first way in which the radially outer region is ahead of the radially inner region of the feed channel when the member is the lower axial face of the ring element, a second way in which the radially outer region is behind the radially inner region of the feed channel when the member is the upper axial face of the housing part.

2. The apparatus of claim 1, wherein the rotating ring element is configured as a blade support for cutting blades rotating about a rotation axis along a cutting grid and adapted to chop items to be processed, said housing part being configured to accommodate the cutting grid and having an axial opening in a region of the cutting grid.

3. The apparatus of claim 1, wherein the member comprises a plurality of said recessed feed channel distributed in an equidistant manner.

4. The apparatus of claim 1, wherein the at least one feed channel runs in a straight line and is disposed obliquely at an angle of 30° to 60° in relation to the radial direction.

5. The apparatus of claim 1, wherein the at least one feed channel runs in a straight line and is disposed obliquely at an angle of around 45° in relation to the radial direction.

6. The apparatus of claim 1, wherein the at least one feed channel has a depth which corresponds to 0.1 to 0.5 times a length of the feed channel.

7. The apparatus of claim 1, wherein the at least one feed channel has a depth which corresponds to 0.2 times a length of the feed channel.

8. The apparatus of claim 1, wherein an edge between the at least one feed channel and the member has a chamfer.

9. The apparatus of claim 1, wherein the edge has a chamfer of 45°.

10. The apparatus of claim 1, wherein the lower axial face of the ring element has an annular configuration.

11. The apparatus of claim 1, wherein the at least one feed channel opens out at a radial inner periphery of the ring element.

12. The apparatus of claim 1, wherein the at least one feed channel is dimensioned to extend from an outer periphery of the ring element to the inner periphery of the ring element.

13. The apparatus of claim 1, wherein the upper axial face of the housing part has a recessed depression on a ring-element-proximal side for collecting conveyed items being processed.

14. The apparatus of claim 2, wherein the upper axial face of the housing part has a recessed depression on a ring-element-proximal side for collecting conveyed items being processed, said depression opening into a holder for the cutting grid.

15. The apparatus of claim 14, wherein the depression is disposed behind the cutting grid relative to a rotation direction of the ring element.

16. The apparatus of claim 13, wherein the depression has a depth which decreases in a rotation direction of the ring element.

17. Apparatus for a kitchen appliance for handling items to be processed, the apparatus comprising:
a static housing part having an upper axial face; and
a rotating ring element having a lower axial face which rests on the upper axial face of the static housing part in the presence of an annular gap there between,
at least one member selected from the group consisting of the upper axial face, the lower axial face and the rotating ring element being configured for radially conveying items being processed in the kitchen appliance out of the annular gap, the member being constructed for radial conveying the items being processed in a direction of a rotation axis of the rotating ring element,
the upper axial face of the housing part having a recessed depression on a ring-element-proximal side for collecting conveyed items being processed, the depression having a depth which decreases in a rotation direction of the ring element.

18. A food processor having an apparatus for a kitchen appliance for handling items to be processed, said apparatus including a static housing part having an upper axial face and a rotating ring element having a lower axial face which rests on the upper axial face of the static housing part, at least one member selected from the group consisting of the upper axial face, the lower axial face and the rotating ring element being configured for conveying items being processed in the kitchen appliance out of an annular gap between the upper axial face and the lower axial face, the member including at least one recessed feed channel extending obliquely in a radial direction, said feed channel having a radially outer region and a radially inner region, with the radially outer region of the feed channel provided in relation to the radially inner region of the feed channel in at least one of two ways, a first way in which the radially outer region is ahead of the radially inner region of the feed channel when the member is the lower axial face of the ring element, a second way in which the radially outer region is behind the radially inner region of the feed channel when the member is the upper axial face of the housing part.

19. The food processor of claim 18, wherein the rotating ring element is configured as a blade support for cutting blades rotating about a rotation axis along a cutting grid and adapted to chop items to be processed, said housing part being configured to accommodate the cutting grid and having an axial opening in a region of the cutting grid.

20. The food processor of claim 18, wherein the member is constructed so as to effect the radial conveying of the items being processed in a direction of a rotation axis of the rotating ring element.

21. The food processor of claim 18, wherein the member comprises a plurality of said recessed feed channel distributed in an equidistant manner.

22. The food processor of claim 18, wherein the at least one feed channel runs in a straight line and is disposed obliquely at an angle of 30° to 60° in relation to the radial direction.

23. The food processor of claim 18, wherein the at least one feed channel runs in a straight line and is disposed obliquely at an angle of around 45° in relation to the radial direction.

24. The food processor of claim 18, wherein the at least one feed channel has a depth which corresponds to 0.1 to 0.5 times a length of the feed channel.

25. The food processor of claim 18, wherein the at least one feed channel has a depth which corresponds to 0.2 times a length of the feed channel.

26. The food processor of claim 18, wherein an edge between the at least one feed channel and the member has a chamfer.

27. The food processor of claim 18, wherein the edge has a chamfer of 45°.

28. The food processor of claim 18, wherein the lower axial face of the ring element has an annular configuration.

29. The food processor of claim 18, wherein the at least one feed channel opens out at a radial inner periphery of the ring element.

30. The food processor of claim 18, wherein the at least one feed channel is dimensioned to extend from an outer periphery of the ring element to the inner periphery of the ring element.

31. The food processor of claim 18, wherein the upper axial face of the housing part has a recessed depression on a ring-element-proximal side for collecting conveyed items being processed.

32. The food processor of claim 19, wherein the upper axial face of the housing part has a recessed depression on a ring-element-proximal side for collecting conveyed items being processed, said depression opening into a holder for the cutting grid.

33. The food processor of claim 32, wherein the depression is disposed behind the cutting grid relative to a rotation direction of the ring element.

34. The food processor of claim 31, wherein the depression has a depth which decreases in a rotation direction of the ring element.

* * * * *